(12) United States Patent
Soyfertis

(10) Patent No.: US 6,838,619 B1
(45) Date of Patent: Jan. 4, 2005

(54) TAMPER RESISTANCE APPARATUS FOR AN ELECTRICAL DEVICE AND AN ELECTRICAL DEVICE INCLUDING THE APPARATUS

(75) Inventor: Mikhail Soyfertis, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/750,563

(22) Filed: Dec. 30, 2003

(51) Int. Cl.[7] .................................................. H02G 3/08
(52) U.S. Cl. ............................ 174/50; 174/53; 174/58; 439/535
(58) Field of Search ............................ 174/50, 53, 57, 174/58; 220/402; 248/906; 439/535

(56) References Cited

U.S. PATENT DOCUMENTS

| | | | | |
|---|---|---|---|---|
| 6,367,642 B2 | * | 4/2002 | Kambouris et al. | 220/4.22 |
| 6,452,096 B1 | * | 9/2002 | Childers | 174/50 |
| 6,492,590 B1 | * | 12/2002 | Cheng | 174/50 |
| 6,527,135 B1 | * | 3/2003 | Braun et al. | 220/4.02 |
| 6,642,446 B2 | * | 11/2003 | Dodds et al. | 174/50 |
| 6,708,834 B2 | * | 3/2004 | Hagerman, III | 220/4.02 |
| 6,717,050 B2 | * | 4/2004 | Laflamme et al. | 174/50 |

* cited by examiner

Primary Examiner—Dhiru R. Patel
(74) Attorney, Agent, or Firm—Ingressia Fisher & Lorenz, P.C.

(57) ABSTRACT

An apparatus that prevents tampering into an electrical device container in which a power circuit is at least partially enclosed includes a housing having an end that is adapted to be coupled to the container, an electrical switch secured within the housing and adapted to be coupled to the power circuit, and a skirt substantially covering the housing and the electrical switch, and having a pliable shoulder portion that defines an opening through which the housing end extends. The shoulder portion is formed from a rubber material in an exemplary embodiment.

26 Claims, 4 Drawing Sheets

TAMPER RESISTANCE APPARATUS FOR AN ELECTRICAL DEVICE AND AN ELECTRICAL DEVICE INCLUDING THE APPARATUS

TECHNICAL FIELD

The present invention generally relates to data terminals such as personal identification number (PIN) pad transaction devices, telecommunication equipment, scanners, and other devices that receive, store, or transmit data. More particularly, the present invention relates to devices and methods for making such electrical modules tamper resistant.

BACKGROUND

Many electrical devices store or transmit data that may be encrypted or otherwise secured. Such devices often include mechanical or electrical tamper resistance equipment to prevent a security breach. Tamper resistance equipment sometimes includes a mechanism to block or disconnect a communication line or a power line when security is breached. For instance, if the electrical device is opened in an unauthorized manner the device may be programmed or equipped to shut down entirely or in part.

One type of tamper resistance apparatus includes a switch that is connected to a power source. The switch is included in a housing that is mounted on a circuit board that includes the power circuit. The housing maintains electrical contact between the switch and the power source as long as the apparatus is structurally intact. If the device is opened or has its structural integrity compromised in some other way, the housing is displaced. The switch is displaced along with the housing, causing a break in the power circuit. The loss of power prevents data retrieval from the apparatus.

Although the above-described tamper resistance apparatus is very effective in most cases, some people have attempted to find ways to open electrical devices without breaking the power circuit. One possible way to maintain the power circuit may be to drill into the device interior and break any joints that would normally pull the tamper resistance apparatus away from the power circuit when the device is opened. Another possible way to maintain the power circuit may be to insert glue into the device interior to adhere the circuit housing to a circuit board so that the switch is not pulled away when the device is opened. Yet another possible way to prevent the power circuit from breaking may be to insert a conductive fluid into the housing interior. The conductive fluid will complete the power circuit even if the switch is pulled away from the circuit board.

Although the above attempts for opening the electrical device without breaking the power circuit would not be very effective, it is desirable to provide an improved tamper resistance apparatus. In addition, it is desirable to provide an efficient and cost effective way to manufacture the improved tamper resistance apparatus. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided to prevent tampering into an electrical device container in which a power circuit is at least partially enclosed. The apparatus comprises a housing having an end that is adapted to be coupled to the container, an electrical switch secured within the housing and adapted to be coupled to the power circuit, and a skirt substantially covering the housing and the electrical switch, and having a pliable shoulder portion that defines an opening through which the housing end extends. The shoulder portion is formed from a rubber material in an exemplary embodiment of the invention.

A tamper resistant electrical device is also provided. The device comprises a container, a substrate disposed inside the container, a power circuit formed on the substrate, and an apparatus to prevent tampering into the container. The apparatus to prevent tampering comprises a housing having an end that is coupled to the container, an electrical switch secured within the housing and coupled to the power circuit, and a skirt substantially covering the housing and the electrical switch, and having a pliable shoulder portion that defines an opening through which the housing end extends. The shoulder portion is formed from a rubber material in an exemplary embodiment of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
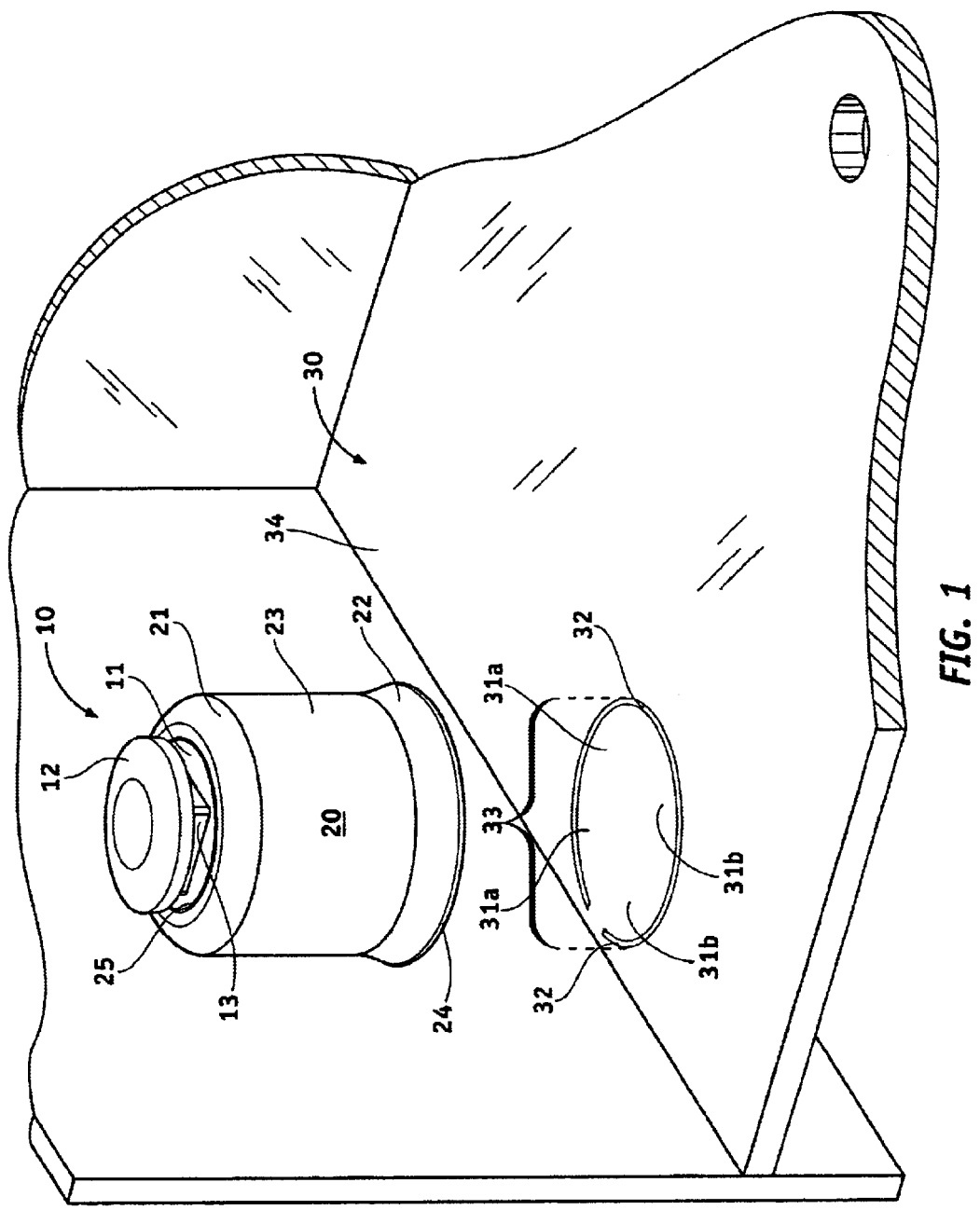
FIG. 1 is an exploded view of a circuit board and a tamper resistance apparatus mounted thereon during use according to an embodiment of the present invention.

The present invention includes a tamper resistance apparatus, including an electrical switch that is held in place within an electrical device interior and completes a power circuit until the device's structural integrity is compromised. The tamper resistance apparatus can be utilized with any suitable electrical device, and exemplary devices include data terminals such as personal identification number (PIN) pad transaction devices, telecommunication equipment, scanners, and other devices that receive, store, or transmit private or sensitive data FIG. 1 is an exploded view of a circuit board 30 having a surface 34 with a tamper resistance apparatus 10 mounted thereon during use according to one embodiment of the invention. The circuit board 30 is coupled to the device housing or container 40, and includes power circuit contacts 31 that are coupled to at least one power source. In the embodiment depicted in FIG. 1, two of the power circuit contacts 31a are connected to an external power source and two other power circuit contacts 31b are connected to an internal power source such as a battery. A ground material 32 surrounds the power circuit contacts 31, and defines a mounting area 33 on the circuit board surface 34.

Figure 2:
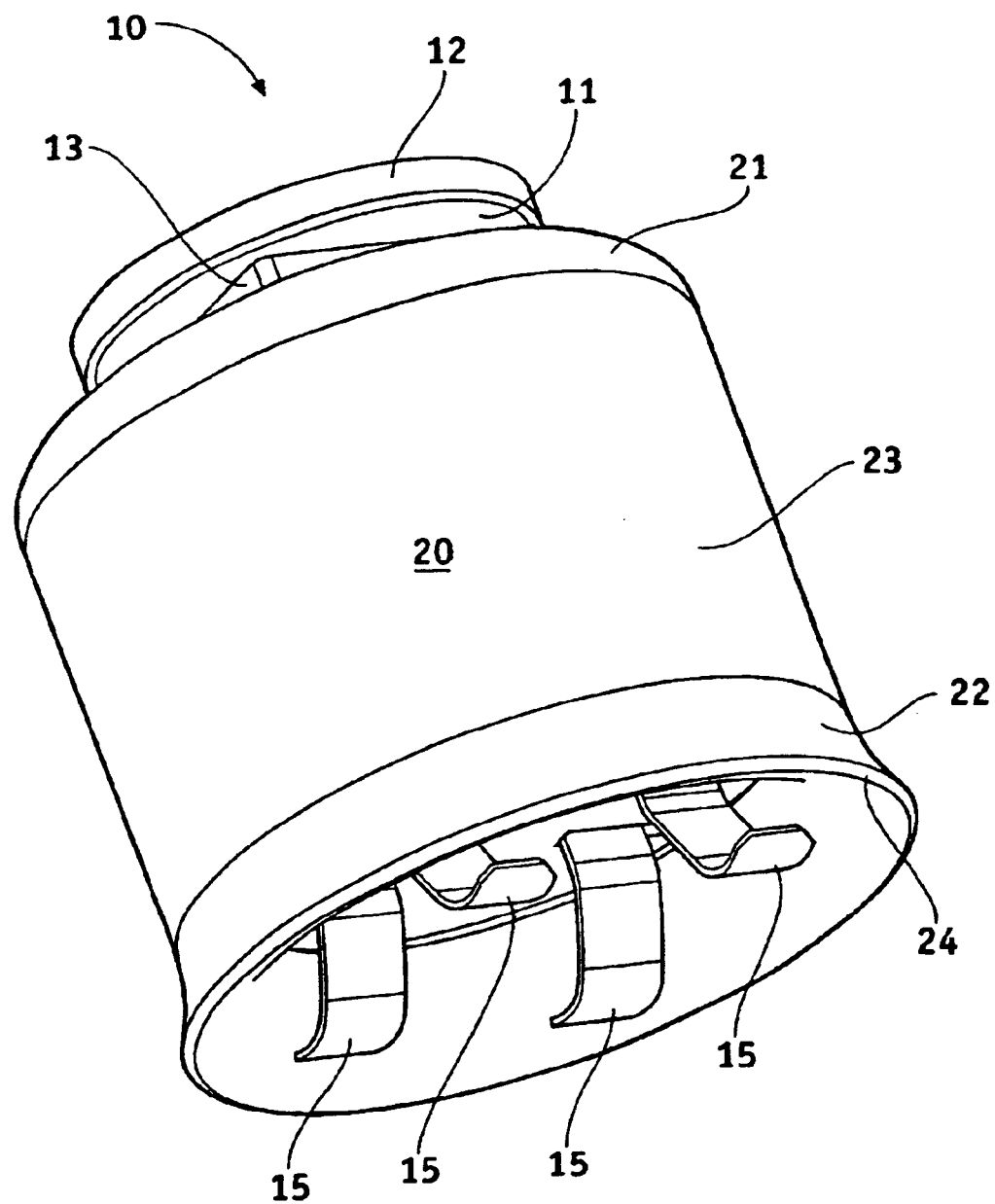
FIG. 2 is an isometric view of a tamper resistance apparatus according to an embodiment of the present invention.
Figure 3:
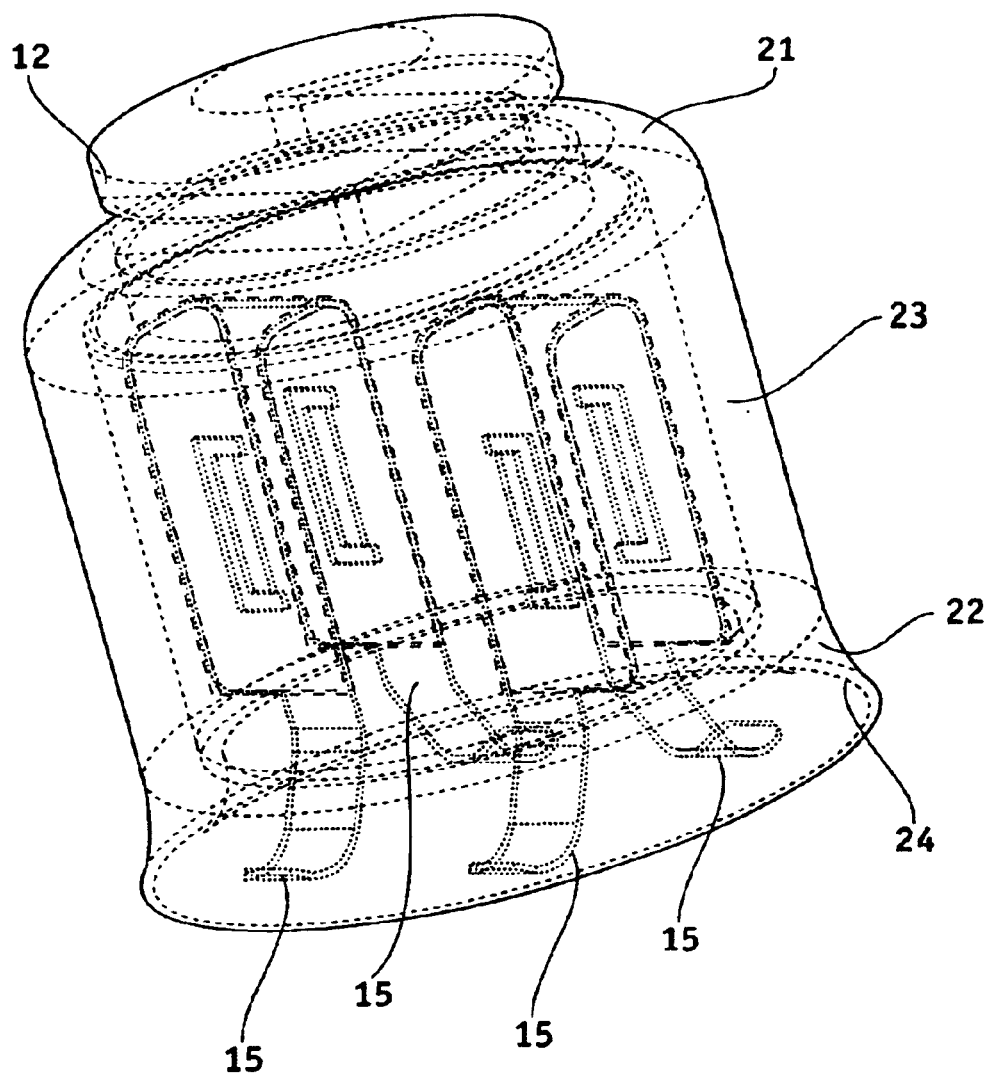
FIG. 3 is a transparent isometric view of a tamper resistance apparatus according to an embodiment of the invention.
Figure 4:
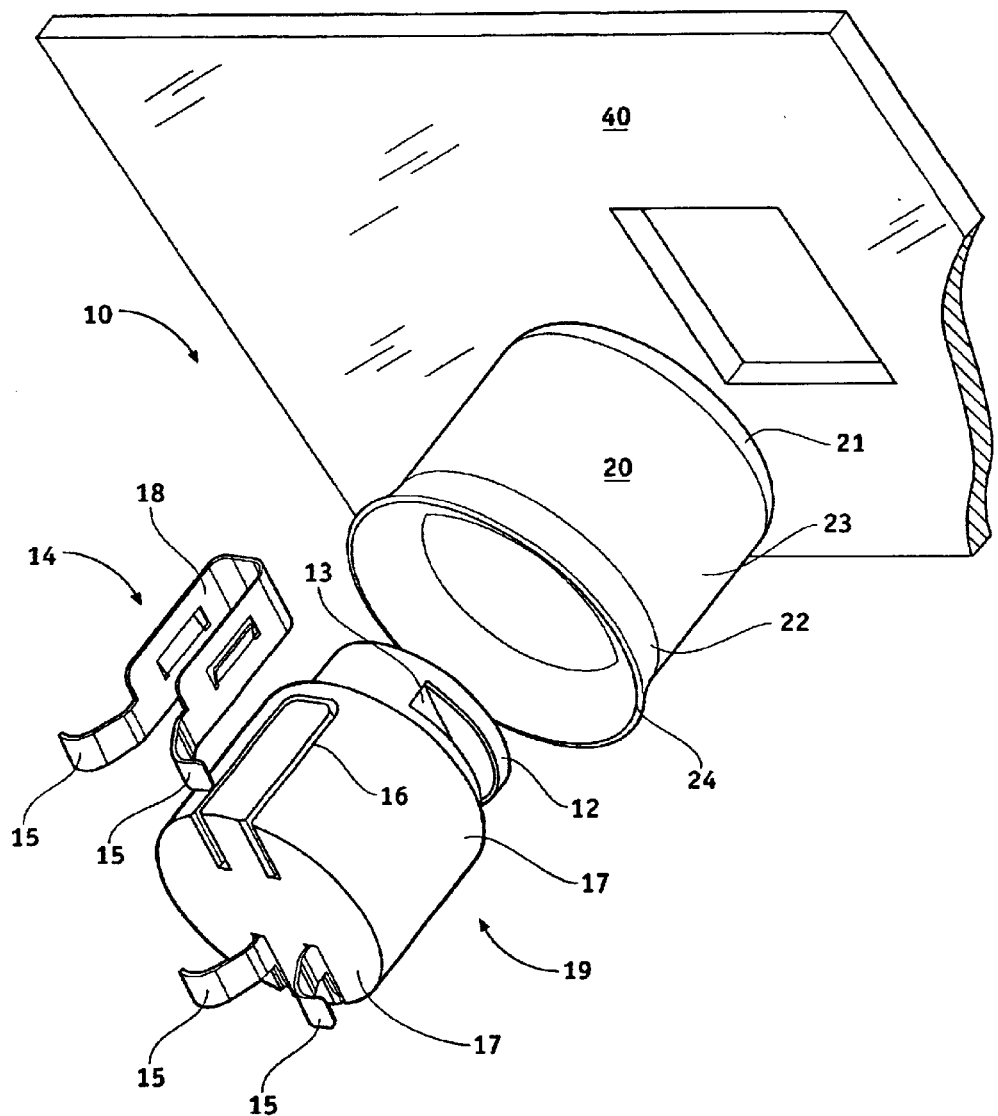
FIG. 4 is an exploded view of a tamper resistance apparatus according to an embodiment of the invention.

FIGS. 2 to 4 illustrate the tamper resistance apparatus 10, which includes a nonconductive housing or boss 19 that houses electrical contacts 14 and is partially surrounded by a nonconductive flexible skirt 20. FIGS. 2 and 3 are isometric views of the apparatus 10, with FIG. 3 providing a transparent view to depict the interior components as well as the apparatus exterior. An exploded view of the apparatus 10 is depicted in FIG. 4. The boss 19 is formed of a nonconductive material such as a hardened resin to prevent causing a short in the power circuit on the circuit board 30. The resin or other conductive material can be molded to provide a groove 11 that engages with the container 40, a chassis or other engaging component when the tamper resistance apparatus 10 is installed. A structure such as the square-edged body 13 inside the groove 11 further enables a secure coupling with a portion of the container 40, a chassis or other engaging component that is adapted to match with the square-edged body 13. If the electrical device's structural integrity is subject to tampering or otherwise compromised, a lip 12 on one side of the groove 11 will be pulled by the container 40, a device chassis or other engaging component, and the entire tamper resistance apparatus 10 will be separated from the circuit board mounting area 33.

Switch contacts 14 are secured partially inside the boss 19. The switch contacts 14 include a main body portion 18 that is housed inside the boss 19 when the apparatus 10 is intact, and terminals or flanges 15 that extend outside the boss 19. The apparatus 10 is assembled by sliding the switch contacts 14 through slots 16 formed in the boss walls 17 so that the switch contact terminal or flanges 15 complete the power circuit by coupling with the power circuit contacts 31 when the apparatus 10 is installed.

The switch contacts 14 are rigidly mounted in the boss 19 and consequently are separated from the power circuit contacts 31a, 31b, hereinafter referred to generally as 31, if the boss 19 is repositioned. One way that the boss may be repositioned is by separating the circuit board 30 from the container 40, chassis or other engaging component that engages with the boss groove 11. The circuit board 30 and the container 40, chassis or other engaging component are typically separated if the electrical device is being tampered with, and the tamper resistance apparatus 10 causes power to be disconnected if such tampering occurs. As mentioned above, one way to maintain the power circuit is to insert glue into the device interior to adhere the boss 19 to the circuit board 30 so that the switch contacts 14 are not displaced when the device is opened. Another possible way to prevent the power circuit from breaking is to insert a conductive fluid into the device. The conductive fluid completes the power circuit even if the switch contacts 14 are pulled away from the circuit board 30. In order to prevent glue or conductive fluid from disabling the tamper resistance apparatus 10, the skirt 20 is provided about the boss periphery. The skirt 20 is shaped to conform to the boss dimensions. More particularly, the skirt depicted in the figures includes a wall 23 that snugly surrounds at least a portion of the boss wall 17.

In exemplary embodiment of the invention, an outwardly flaring portion 22 of the wall 17 extends outwardly at one end of the skirt 20. The outwardly flaring portion 22 also defines a circular edge 24 that abuts the circuit board 30 to shield the circuit board mounting area 33 from glue or conductive fluid. The flaring portion 22 has an increasing diameter as it approaches the mounting area, and consequently directs any glue or other fluid away from the mounting area 33. In a further exemplary embodiment, the circular edge 24 is sized to surround the ground material 32 that defines the mounting area 32, and to thereby create a fluid-impermeable seal around the power circuit contacts 31 in the mounting area 32.

In yet another exemplary embodiment of the invention, the skirt 20 includes a soft shoulder portion 21 that defines an opening 25 through which the boss lip 12 and grove 11 extend. The soft shoulder portion 21 allows the groove 11 to remain exposed for engagement with the container 40, chassis or other engaging component, but creates a substantially fluid-impermeable seal with the boss 19 to prevent glue or conductive fluid from reaching the skirt interior. The opening 25 can have a substantially circular shape, with a diameter that is smaller than the soft shoulder portion 21 to allow the soft shoulder portion 21 to form around the boss 19 and create the substantially fluid impermeable seal.

The skirt 20 is made of a suitable flexible nonconductive material, and typically is made of a soft rubber such as polyurethane or another soft material. In an exemplary embodiment the entire skirt 20 is uniformly made of a single rubber material, including the flaring portion 22 and the soft shoulder portion 21. Alternatively, the skirt 20 may be formed primarily from a relatively rigid material as long as the soft shoulder portion 21 is made of the made of a sufficiently soft and pliable material to allow the entire boss 19 to be pulled through the opening 25 in the event that the boss 19 is pulled away from the circuit board 30. Therefore, if the electrical device has its structural integrity compromised such that the circuit board and the container 40, a chassis or other component engaging with the groove 11 are separated, the boss 19 can separate from the circuit board 30 without hindrance from the skirt 20. If glue or conductive fluid has been inserted into the device interior as an attempt to hold the boss 19 in place, the skirt will prevent the glue or conductive fluid from contacting the boss 19. If the skirt 20 becomes glued in place before the electrical device is opened, the boss 19 will be pulled through the opening 25 or sufficiently displaced to disconnect the power circuit. Consequently, the skirt 20 in combination with the boss provides a tamper resistance apparatus 10 prevents sensitive data from being removed from the electrical device due to tampering.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus to prevent tampering into an electrical device container in which a power circuit is at least partially enclosed, the apparatus comprising:
   a housing having an end that is adapted to be coupled to said container;
   an electrical switch secured within said housing and adapted to be coupled to said power circuit; and
   a skirt substantially covering said housing and said electrical switch, and having a pliable shoulder portion that defines an opening through which said housing end extends.

2. The apparatus according to claim 1, wherein said pliable shoulder portion is formed from a rubber material.

3. The apparatus according to claim 2, wherein said skirt is formed entirely from a rubber material.

4. The apparatus according to claim 1, wherein said electrical switch includes terminals extending outside of said housing in a direction toward said power circuit, and said skirt extends as far as said terminals in the same direction.

5. The apparatus according to claim 1, wherein said skirt shoulder portion closely surrounds said housing to create a substantially fluid impermeable seal around said housing.

6. The apparatus according to claim 1, wherein said power circuit is formed on a circuit board that is enclosed within said container, and said skirt is adapted to abut with said circuit board and form a substantially fluid impermeable seal with said circuit board.

7. The apparatus according to claim 6, wherein said skirt has an outwardly extending flaring portion that is adapted to form said substantially fluid impermeable seal with said circuit board.

8. The apparatus according to claim 6, wherein said skirt opening is substantially circular and has a first diameter, and said skirt has an outwardly extending flaring portion that is adapted to form a substantially fluid impermeable seal with said circuit board and has a second diameter that is larger than said first diameter.

9. The apparatus according to claim 1, wherein said skirt comprises polyurethane rubber.

10. A tamper resistant electrical device, comprising:
  a container;
  a substrate disposed inside said container;
  a power circuit component formed on said substrate; and
  an apparatus to prevent tampering into said container, comprising:
    a housing having an end that is coupled to said container,
    an electrical switch secured within said housing and coupled to said power circuit, and
    a skirt substantially covering said housing and said electrical switch, and having a pliable shoulder portion that defines an opening through which said housing end extends.

11. The device according to claim 10, wherein said pliable shoulder portion is formed from a rubber material.

12. The device according to claim 11, wherein said skirt is formed entirely from a rubber material.

13. The device according to claim 10, wherein said electrical switch includes terminals extending outside of said housing and coupling said power circuit to said electrical switch, and said skirt abuts said substrate.

14. The device according to claim 10, wherein said skirt shoulder portion closely surrounds said housing to create a substantially fluid impermeable seal around said housing.

15. The device according to claim 14, wherein said substrate is a circuit board, and said skirt forms a substantially fluid impermeable seal with said circuit board.

16. The device according to claim 15, wherein said skirt has an outwardly extending flaring portion that forms said substantially fluid impermeable seal with said circuit board.

17. The device according to claim 16, wherein said skirt opening is substantially circular and has a first diameter, and said skirt has an outwardly extending flaring portion that forms said substantially fluid impermeable seal with said circuit board and has a second diameter that is larger than said first diameter.

18. The device according to claim 10, wherein said skirt comprises polyurethane rubber.

19. The device according to claim 10, wherein said housing end comprises a groove that directly engages with said container.

20. The device according to claim 19, wherein said housing end further comprises a lip that is continuous with said groove and that directly engages with said container in a manner whereby opening said container causes said housing to be pulled through said skirt opening by said lip.

21. The device according to claim 19, wherein said housing end further comprises a square edged body that is disposed within said groove for secure engagement with said container.

22. The device according to claim 10, wherein said substrate comprises power circuit contacts that are coupled to said electrical switch.

23. The device according to claim 22, wherein said substrate further comprises a ground material formed on said substrate and defining a mounting area that includes said power circuit contacts.

24. The device according to claim 23, wherein said skirt forms a substantially fluid impermeable seal around said ground material.

25. The device according to claim 24, wherein said skirt has an outwardly extending flaring portion that forms said substantially fluid impermeable seal around said ground material.

26. The device according to claim 25, wherein said skirt opening is substantially circular and has a first diameter, and said skirt has an outwardly extending flaring portion that forms said substantially fluid impermeable seal around said ground material and has a second diameter that is larger than said first diameter.

* * * * *